(12) United States Patent
Wu

(10) Patent No.: US 10,667,213 B2
(45) Date of Patent: May 26, 2020

(54) APPARATUS AND METHOD FOR POWER SAVING FOR CELLULAR INTERNET OF THINGS DEVICES

(71) Applicant: Samsung Electronics Co., Ltd, Gyeonggi-do (KR)

(72) Inventor: Jian Jun Wu, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 144 days.

(21) Appl. No.: 15/230,344

(22) Filed: Aug. 5, 2016

(65) Prior Publication Data

US 2017/0041873 A1 Feb. 9, 2017

(30) Foreign Application Priority Data

Aug. 5, 2015 (GB) .................................. 1513873.8
Aug. 2, 2016 (KR) ........................ 10-2016-0098491

(51) Int. Cl.
*H04W 52/02* (2009.01)
*H04W 60/00* (2009.01)
(Continued)

(52) U.S. Cl.
CPC ......... *H04W 52/0219* (2013.01); *H04W 4/70* (2018.02); *H04W 60/00* (2013.01);
(Continued)

(58) Field of Classification Search
None
See application file for complete search history.

(56) References Cited

U.S. PATENT DOCUMENTS

| 8,472,956 B2 * | 6/2013 | Wang ..................... H04W 4/08 455/436 |
| 2008/0186912 A1 * | 8/2008 | Huomo ............... H04W 76/045 370/329 |

(Continued)

FOREIGN PATENT DOCUMENTS

EP        1146756 A1    10/2001

OTHER PUBLICATIONS

ETSI TS 124 008 V8.6.0, "Digital Cellular Telecommunications System (Phase 2+); Universal Mobile Telecommunications System (UMTS); LTE; Mobile Radio Interface Layer 3 Specification; Core Network Protocols; Stage 3, (3GPP TS 24.008 version 8.6.0 Release 8)", Jul. 2009, 583 pages.

(Continued)

*Primary Examiner* — Thinh D Tran

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT) or Cellular Internet of Things (CIoT). The present disclosure may be applied to intelligent services based on the 5G communication technology and the IoT-related technology, such as smart home, smart building, smart city, smart car, connected car, health care, digital education, smart retail, security and safety services. An operating method of a terminal located within a predetermined area in a wireless environment comprises transmitting, to a base station connected to a network, registration information for registering with the network, wherein the registration information includes information for indicating that the predetermined area is included in a coverage area of the base station, and communicating with the base station based on the registration information.

18 Claims, 8 Drawing Sheets

(51) Int. Cl.
　　　*H04W 74/00*　　　(2009.01)
　　　*H04W 4/70*　　　(2018.01)
　　　*H04W 72/04*　　　(2009.01)
　　　*H04W 8/22*　　　(2009.01)

(52) U.S. Cl.
　　　CPC ............ *H04W 74/006* (2013.01); *H04W 8/22* (2013.01); *H04W 72/0413* (2013.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/21* (2018.01); *Y02D 70/24* (2018.01)

(56) References Cited

U.S. PATENT DOCUMENTS

| | | | |
|---|---|---|---|
| 2009/0005127 A1* | 1/2009 | Frenger | H04W 52/28 455/574 |
| 2010/0189087 A1* | 7/2010 | Hara | H04W 48/16 370/338 |
| 2013/0201960 A1* | 8/2013 | Kim | H04L 1/1861 370/331 |
| 2013/0210414 A1 | 8/2013 | Fang et al. | |
| 2013/0229964 A1* | 9/2013 | Chakravarthy | H04W 52/0212 370/311 |
| 2013/0301501 A1 | 11/2013 | Olvera-Hernandez et al. | |
| 2013/0322360 A1 | 12/2013 | Fan et al. | |
| 2014/0022974 A1 | 1/2014 | Eriksson et al. | |
| 2015/0009815 A1* | 1/2015 | Hsu | H04W 76/28 370/230.1 |
| 2016/0007316 A1* | 1/2016 | Vaidya | H04W 64/003 370/312 |

OTHER PUBLICATIONS

3GPP TS 22.368 V13.1.0, "3rd Generation Partnership Project; Technical Specification Group Services and System Aspects; Service Requirements for Machine-Type Communications (MTC); Stage 1 (Release 13)", Dec. 2014, 26 pages.

3GPP TR 45.820 V1.4.0, "3rd Generation Partnershp Project; Technical Specification Group GSM/EDGE Radio Access Network; Cellular System Support for Ultra Low Complexity and Low Throughput Internet of Things; (Release 13)", Jul. 2015, 361 pages.

Draft3GPP TR 45.820 V2.0.0, "3rd Generation Partnershp Project; Technical Specification Group GSM/EDGE Radio Access Network; Cellular System Support for Ultra Low Complexity and Low Throughput Internet of Things; (Release 13)", Aug. 2015, 506 pages.

Samsung, et al., "PCR TR 45.820—Updates on Annex A", 3GPP TSG GERAN#66, GP-151038, Agenda Item 11.4, Yinchuan, China, May 10-14, 2015, 3 pages.

Samsung Research Institutue UK, "Discussions on Stationary and Non-Stationary CIoT Devices", GP-150849, Yin Chuan, P.R. China, Aug. 10-14, 2015, 3 pages.

SIGFOX, "PCR for Text Inclusion in TR 45.820: C-UNB General Description, Revision of PG-150633", 3GPP GERAN ad'hoc Meeting #3, GPC 150315, Kista, Sweden, Jun. 29-Jul. 2, 2015, 4 pages.

Search and Examination Report dated Jan. 22, 2016 in connection with British Patent Application No. GB1513873.8, 6 pages.

* cited by examiner

APPARATUS AND METHOD FOR POWER SAVING FOR CELLULAR INTERNET OF THINGS DEVICES

CROSS-REFERENCE TO RELATED APPLICATION(S) AND CLAIM OF PRIORITY

The present application is related to and claims priority under 35 U.S.C. § 119(a) to United Kingdom Patent Application Serial No. 1513873.8, which was filed in the United Kingdom Intellectual Property Office on Aug. 5, 2015 and Korean Application Serial No. 10-2016-0098491, which was filed in the Korean Intellectual Property Office on Aug. 2, 2016, respectively, the contents of which are incorporated herein by reference.

TECHNICAL FIELD

This disclosure relates to power saving for cellular Internet of Things (IoT) or CIoT devices. In particular, certain embodiments relate to power saving for cellular IoT devices with limited mobility.

BACKGROUND

To meet the increased demand for wireless data traffic since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mm-Wave) bands, e.g., 60 GHz bands, so as to accomplish higher data rates. To decrease propagation loss of the radio waves and increase the transmission distance various techniques, for example, beamforming, massive multiple-input multiple-output (MIMO), Full Dimensional MIMO (FD-MIMO), array antenna, analog beamforming, and large scale antenna techniques, are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, hybrid frequency-shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

Throughout this disclosure, both IoT devices and CIoT devices are referred to, however, the techniques disclosed herein are not limited to only one of these types of devices and may be implemented on any user equipment or terminal device, for example, a smart phone, tablet, or computer. In a number of the exemplary IoT devices set out above, it may not be practical or cost efficient to provide a main power connection or a means to recharge/charge or change batteries. Furthermore, current expectation is that the battery lifespan of IoT devices should be 10 years or more such that devices and/or batteries do not require frequent replacement. Accordingly, there is a need to reduce the power consumption of IoT devices. With regard to CIoT devices, their communication via cellular networks may represent a significant portion of their battery usage and therefore, reducing the power consumed by cellular communications at a CIoT device may be important in achieving the 10 or more years battery life currently expected. Consequently, reducing the power consumed by communications of CIoT devices presents a technical problem to be solved.

In accordance with an embodiment of the present disclosure, a method for operating a terminal located within a predetermined area in a wireless environment comprises transmitting, to a base station connected to a network, registration information for registering with the network, wherein the registration information includes information for indicating that the predetermined area is included in a coverage area of the base station, and communicating with the base station based on the registration information.

An apparatus of a base station which is connected to a network comprises, a transceiver, and a controller operatively coupled to the transceiver, wherein the controller is configured to receive, from a terminal which is located within a predetermined area, registration information used for the terminal registering with the network, wherein the registration information includes information for indicating that the predetermined area is included in a coverage area of the base station, and communicating with the terminal based on the registration information.

An apparatus of a terminal located within a predetermined area in a wireless environment comprises a transceiver, and a controller operatively coupled to the transceiver, wherein the controller is configured to transmit, to a base station connected to a network, registration information for registering with the network, wherein the registration information includes information for indicating that the predetermined area is included in a coverage area of the base station, communicate with the base station based on the registration information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
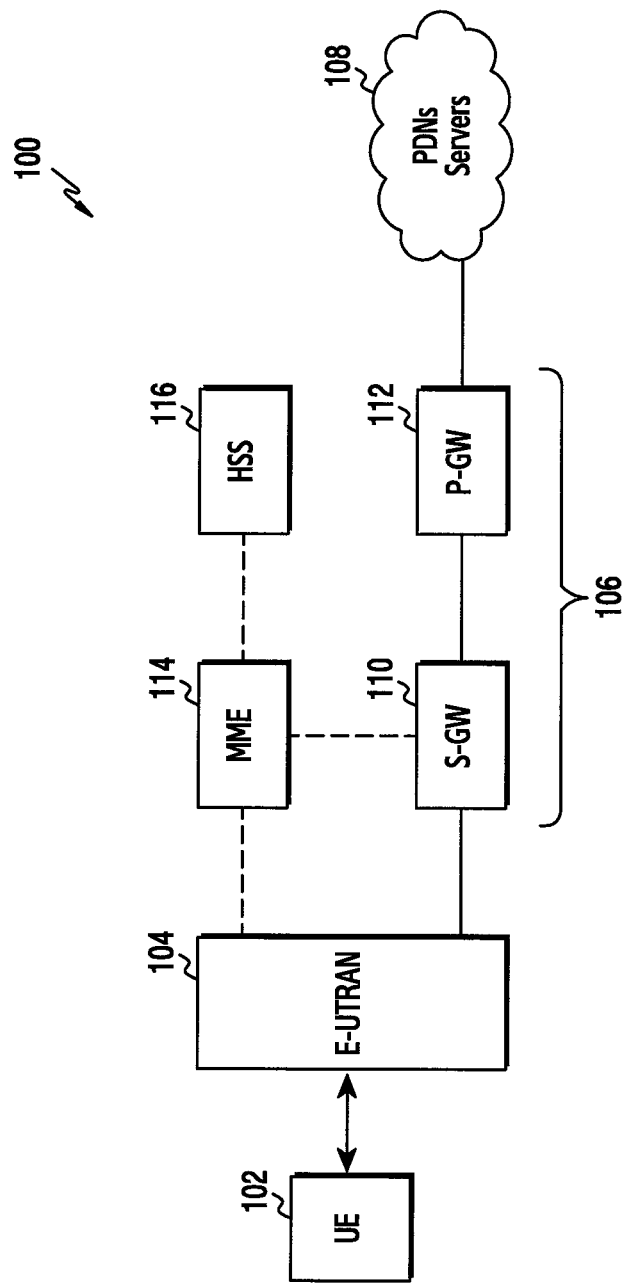
FIG. 1 is a block diagram that illustrates an LTE mobile communication network in accordance with an embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Wireless or mobile (cellular) communications networks in which a mobile terminal (UE, such as a mobile handset, terminal device) communicates via a radio link to a network of base stations or other wireless access points connected to a telecommunications network, have undergone rapid development through a number of generations. The initial deployment of systems using analogue signaling has been superseded by Second Generation (2G) digital systems such as Global System for Mobile communications (GSM), which may use a radio access technology known as GSM Enhanced Data rates for GSM Evolution Radio Access Network (GERAN), combined with an improved core network.

Data services of second generation systems have themselves been largely replaced by or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards Fourth Generation (4G) systems and Fifth Generation (5G) systems.

3GPP design, specify and standardize technologies for mobile wireless communications networks. Specifically, 3GPP produces a series of Technical Reports (TR) and Technical Specifications (TS) that define 3GPP technologies. The focus of 3GPP is currently the specification of standards beyond 3G, and in particular on standard for the Evolved Packet Core and the enhanced radio access network called "E-UTRAN". The E-UTRAN uses the LTE radio technology, which offers potentially greater capacity and additional features compared with previous standards. Despite LTE strictly referring only to the air interface, LTE is commonly used to refer to the whole system including EPC and E-UTRAN. LTE is used in this sense in the remainder of this specification, including when referring to LTE enhancements, such as LTE Advanced. LTE is an evolution of UMTS and shares certain high level components and protocols with UMTS. LTE Advanced offers still higher data rates compared to LTE and is defined by 3GPP standards releases from 3GPP Release 10 up to and including 3GPP Release 12. LTE Advanced is considered to be a 4G mobile communication system by the International Telecommunication Union (ITU).

It is anticipated that 5G mobile communications systems will be rolled-out in the future. Currently, the network structure and wireless access interface to be used in 5G systems has not been decided upon. However, in order to reduce deployment costs and integrate with 4G systems, it is envisaged that 5G systems may utilize some of network architecture currently used in 4G systems.

Consequently, although particular embodiments of the present disclosure may be implemented within an LTE mobile network, they are not so limited and may be considered to be applicable to many types of wireless communication networks, including future 5G systems. However, due to the greater certainty surrounding the structure of systems based upon LTE network, embodiments of the present disclosure will predominantly be described with reference to the structure and network elements of LTE based systems. Consequently, an example LTE system is shown in FIG. 1.

The LTE system of FIG. 1 comprises three high level components: at least one UE 102, the E-UTRAN 104 and the EPC 106. The EPC 106, or core network as it may also be known, communicates with Packet Data Networks (PDNs) and servers 108 in the outside world, such as those which form the Internet for example. FIG. 1 shows the key component parts of the EPC 106. It will be appreciated that FIG. 1 is a simplification and various embodiments implementing LTE will include further components. In FIG. 1 interfaces between different parts of the LTE system are shown. The double ended arrow indicates the air interface between the UE 102 and the E-UTRAN 104. For the remaining interfaces user data is represented by solid lines and signaling is represented by dashed lines.

The E-UTRAN 104, or radio access network (RAN) as it may also be known, comprises a single type of component: an eNB (E-UTRAN Node B) which is responsible for handling radio communications between the UE 102 and the EPC 106 across the air or wireless access interface. An eNB controls UEs 102 in one or more cell. LTE is a cellular system in which the eNBs provide coverage over one or more cells where the cells correspond to a geographical coverage area. Typically there is a plurality of eNBs within an LTE system. In general, a UE operating in accordance with LTE communicates with one eNB through one cell at a time, where an eNB may also be referred to as a base station or mobile base station.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signaling messages exchanged with the UE 102 through the E-UTRAN 104. Each UE is registered with a single MME. There is no direct signaling pathway between the MME 114 and the UE 102 (communication with the UE 102 being across the air interface via the E-UTRAN 104). Signaling messages between the MME 114 and the UE 102 comprise EPS Session Management (ESM) protocol messages controlling the flow of data from the UE to the outside world and EPS Mobility Management (EMM) protocol messages controlling the rerouting of signaling and data flows when the UE 102 moves between eNBs within the E-UTRAN. The MME 114 exchanges signaling traffic with the S-GW 110 to assist with routing data traffic. The MME 114 also communicates with a Home Subscriber Server (HSS) 116 which stores information about users registered with the network.

In additional to the architectural structure discussed above, LTE also includes the concept of bearers, and in particular, EPS bearers, where data transmitted from and received by a UE is associated with a particular bearer. EPS bearers themselves may be formed from an e-Radio Access Bearer (e-RAB) which extends between the UE and EPC and S5/S8 Bearers which extend within the EPC. EPS bearers define how UE data is handled as it passes through the LTE network and may be viewed as a virtual data pipe extending through the core network, where a bearer may have quality of service associated with it, such as a guaranteed bitrate for example. A bearer serves to channel packet data to a Packet Data Network (PDN, also referred to as a Public Data Network) outside of the LTE network via the S-GW and P-GW, where a further external non-LTE bearer may be required to channel data from the EPC to an external network. Each bearer is therefore associated with a certain PDN and all data associated with the bearer passes through a particular P-GW. Each bearer is also identified by a Logical Channel ID (LCID) at the Medium Access Control (MAC) level, where one bearer corresponds to one logical channel.

Recently there has been increased interest in the concept of the Internet of Things (IoT), where a large number of conventionally unconnected devices are provided with means to connect to and communicate with one another and/or communications networks in order to exchange information and perform the control of objects and processes. Examples of devices which may form an IoT include smart utility meters, washing machines, dishwashers, thermostats, home security devices, automobile sensors, health related sensors and so forth.

In 3GPP networks such as those based on LTE and LTE Advanced, terminal devices include two broad modes of operation: Radio Resource Control (RRC_Idle) idle mode and RRC connected mode (RRC_Connected). In the RRC_Idle mode a device is not currently communicating user plane data with the network but is regularly monitoring a paging channel such that the device can be alerted by the network if there is downlink data to be transmitted. Consequently, in RRC_Idle mode no Non-Access Stratum (NAS) signaling exists between the device and the core network, but a PDN connection exists, the device is registered at the MME and the location of the device is known to the MME though the performance of tracking area updates. In contrast, in RRC_Connected mode the device has allocated resources in either the uplink or downlink and is transmitting/receiving or expecting to transmit/receive data in the allocated resources. Even though the signaling performed by device in RRC_Idle mode is reduced compared to the RRC_Connected mode, given the number and regularity of various procedures which are required to be performed in RRC_Idle mode it is unlikely that the desired 10 year battery life desired for CIoT devices will be met using only these two operational modes.

Accordingly, a number of approaches for reducing the power consumption of devices in 3GPP networks have been proposed, two of these are discontinuous reception (DRX) or extended RX (eDRX), and cooperative ultra-narrow band (C-UNB).

Discontinuous Reception (DRX)

Discontinuous reception (DRX) is a technique for reducing power consumption at devices by reducing the time that a device's receiver is operational. As set out above, in RRC_Idle mode a device is required to monitor a paging channel in order that the device can be contacted by the network. However, monitoring the paging channel continuously is a power intensive activity that may require receiving signaling in one channel or in channels located in each subframe of the wireless access interface provided by the mobile communications network and thus requires a receiver to be active for a substantial period of time. Consequently, the concept of DRX was proposed. In DRX, instead of monitoring the paging channel or other physical control channel of every frame or subframe, a device is configured via negotiations with the network to enter a DRX cycle of a particular length, where the device is configured to monitor a paging or downlink control channel only in an active period of the DRX cycle, and the network is configured to only signal to the UE during the active period of the DRX cycle. By virtue of this, the frequency at which the device monitors for networks signaling is reduced. For example, a device may be configured to monitor the paging channel only once per 10 radio frames and enter a sleep-like state (non-active) where the LTE receiver is powered down in between these monitoring instances in order to reduce power consumption. If the network obtains data which is intended for the device, the network waits until the next DRX active period of the device and transmits a paging message to the device, signaling that the device should exit DRX and transition to RRC_Connected in order to receive the downlink data.

In order or to further reduce power consumption, and in particular for Machine Type Communications (MTC) devices, it has been proposed in 3GPP TR 45.820 v1.4.0 to introduce an extended DRX mode (eDRX) where the period of the DRX cycle is significantly increased. Table 1 below shows proposed eDRX cycles where the cycle lengths has a current maximum value of 52 minutes such that a device will check the paging channel or other specified channel approximately every 52 minutes. The desired eDRX cycle is indicated using the four bit EXTENDED_DRX codes, where additional codes not included in the Table 1 may be used for eDRX cycles having a length which are not included in Table 1.

its simplicity. However, its simplicity is also its drawback since packet collisions that hamper the overall efficiency when the network load becomes high are likely. To overcome this issue, the C-UNB RAT implements two mitigation techniques: frequency diversity and spatial diversity.

Figure 2:
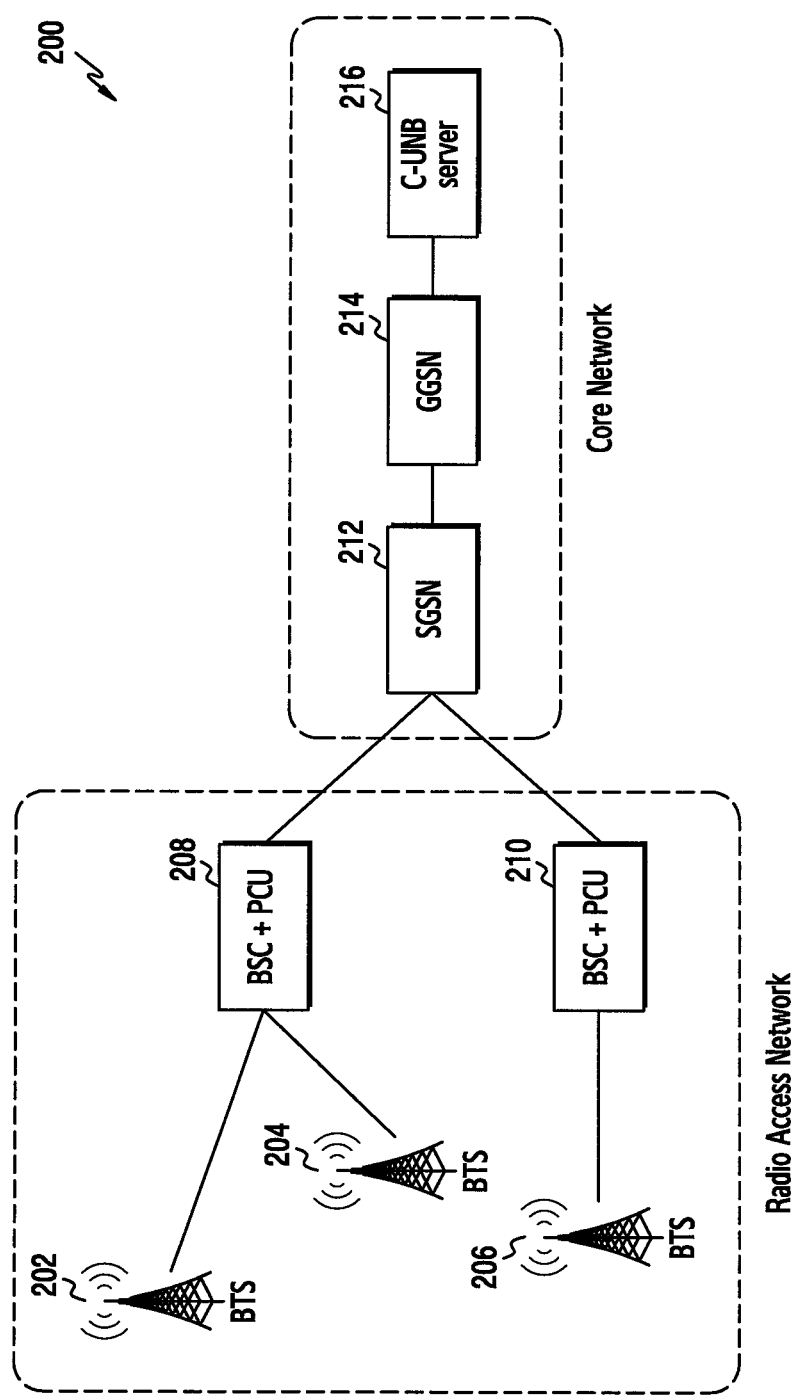
FIG. 2 illustrates a Cooperative Ultra-Narrow Band (C-UNB) communications network in accordance with an embodiment of the present disclosure.

FIG. 2 illustrates a schematic illustration of a C-UNB architecture where additional software and server(s) may be required to implement C-UNB since it does not use existing elements of a 3GPP core network. For example, in addition to the base stations 202, 204 206, the base station controllers (BSC) and packet control units (PCU) 208,210, the Serving HPRS Support Node (SGSN 212), and Gateway GPRS Support Node (GGSN) 214, additional software to handle C-UNB communications is required at the base stations and a C-UNB server 216 is required in the core network to collate the various reception instances of data resulting from the spatial and/or frequency diversity.

Figure 3:
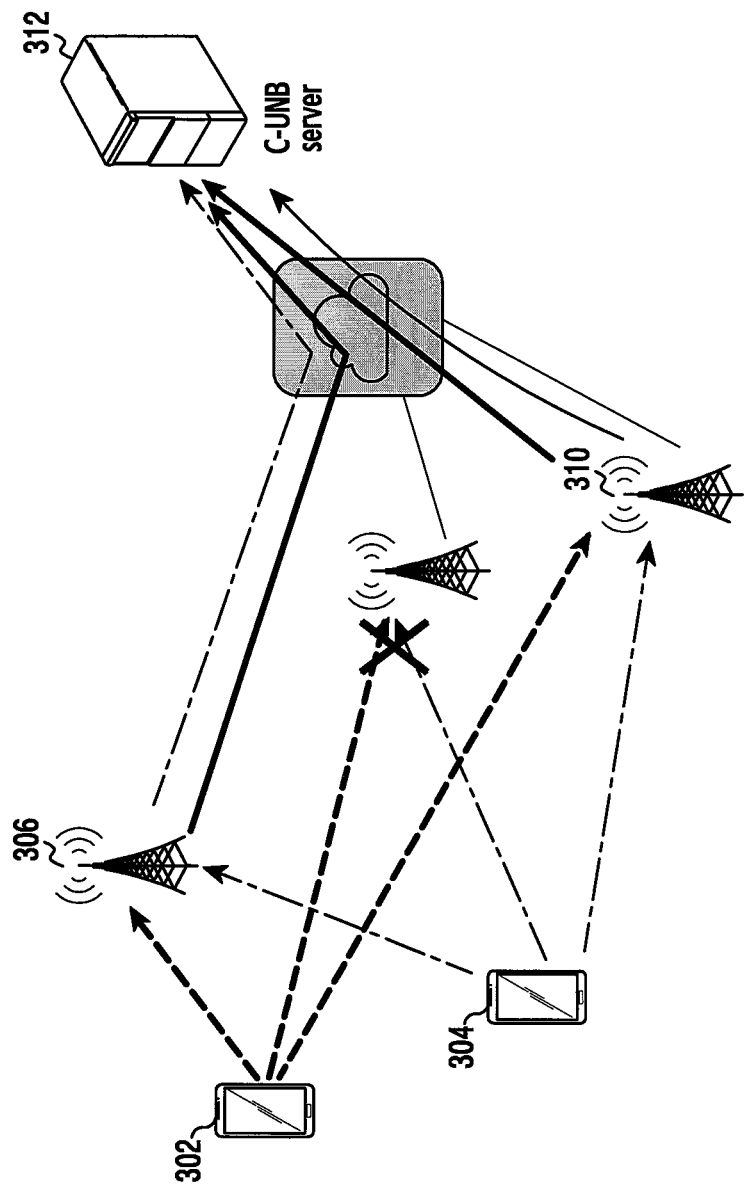
FIG. 3 illustrates a Cooperative Ultra-Narrow Band (C-UNB) communications network in accordance with an embodiment of the present disclosure.

In additional to the use of an alternative network structure, in order to provide the spatial diversity, it is required that base station coverage areas overlap with one another since the radio access network should receive multiple copies of the same radio packet with different base stations. FIG. 3 illustrates a schematic illustration of the use of multiple base stations in order to achieve spatial diversity. More specifically, device 302 transmits a packet which is received at base

TABLE 1

| eDRX Cycle Value (EXTENDED_DRX) | Target eDRX Cycle Length | Number of 51-MF per eDRX Cycle (EXTENDED_DRX_MFRMS) | eDRX Cycles per TDMA FN Space |
| --- | --- | --- | --- |
| 0000 | ~1.9 seconds | 8 | 6656 |
| 0001 | ~3.8 seconds | 16 | 3328 |
| 0010 | ~7.5 seconds | 32 | 1664 |
| 0011 | ~12.2 seconds | 52 | 1024 |
| 0100 | ~24.5 seconds | 104 | 512 |
| 0101 | ~49 seconds | 208 | 256 |
| 0110 | ~1.63 minutes | 416 | 128 |
| 0111 | ~3.25 minutes | 832 | 64 |
| 1000 | ~6.5 minutes | 1664 | 32 |
| 1001 | ~13 minutes | 3328 | 16 |
| 1010 | ~26 minutes | 6656 | 8 |
| 1011 | ~52 minutes | 13312 | 4 |

Note 1:
53248 51-multiframes occur with the TDMA FN space (2715648 TDMA frames)
Note 2:
All remaining EXTENDED_DRX values are reserved Cooperative Ultra Narrow Band (C-UNB)

An alternative method to reduce the power consumption of devices, and CIoT devices in particular, is termed Cooperative Ultra-Narrow Band (C-UNB) radio access technology (RAT). In such an approach devices are not required to be synchronized or attached to network or base station before being allowed to send packets to the network; and thus the control signaling required to be monitored and transmitted by a device is reduced. Instead, network access is based on random transmissions by devices. This kind of medium access is equivalent to ALOHA, which is known for stations A and C 306, 310 and the two reception instances are combined at the C-UNB server in order to take advantage of the spatial diversity. Likewise, device 304 also transmits packets to base stations A and C 306, 310 and the two receptions instances are combined and de-duplicated at the C-UNB server 312 in order to take advantage of the spatial diversity. In addition to the added complexity resulting from the adapted network structure required to take advantage of the spatial diversity, due to access technique of C-UNB there is no acknowledgment of uplink data packets, thus potentially leading to the unreliable transmission of data to the core network. Furthermore, there is no facility for the transmission of data in the downlink to the devices using only C-UNB.

Although the use of eDRX and C-UNB may lead to reductions in power consumption at CIoT devices, there are a number of disadvantages and shortcomings of such techniques that render them unlikely to be able to achieve the power savings required if a battery life exceeding 10 years is to be achieved. For example, with regard to eDRX, the maximum possible cycle lengths may not be sufficient for devices which only wish to report data every week. Likewise, DRX merely reduces the frequency of certain procedures such as paging for example but does not fundamentally change the processes performed by a device. For example, even though eDRX may reduce the frequency at which a paging channel is checked, a number of other procedures at the device are still required to be performed, such as the mobility management procedures for example.

Figure 4:
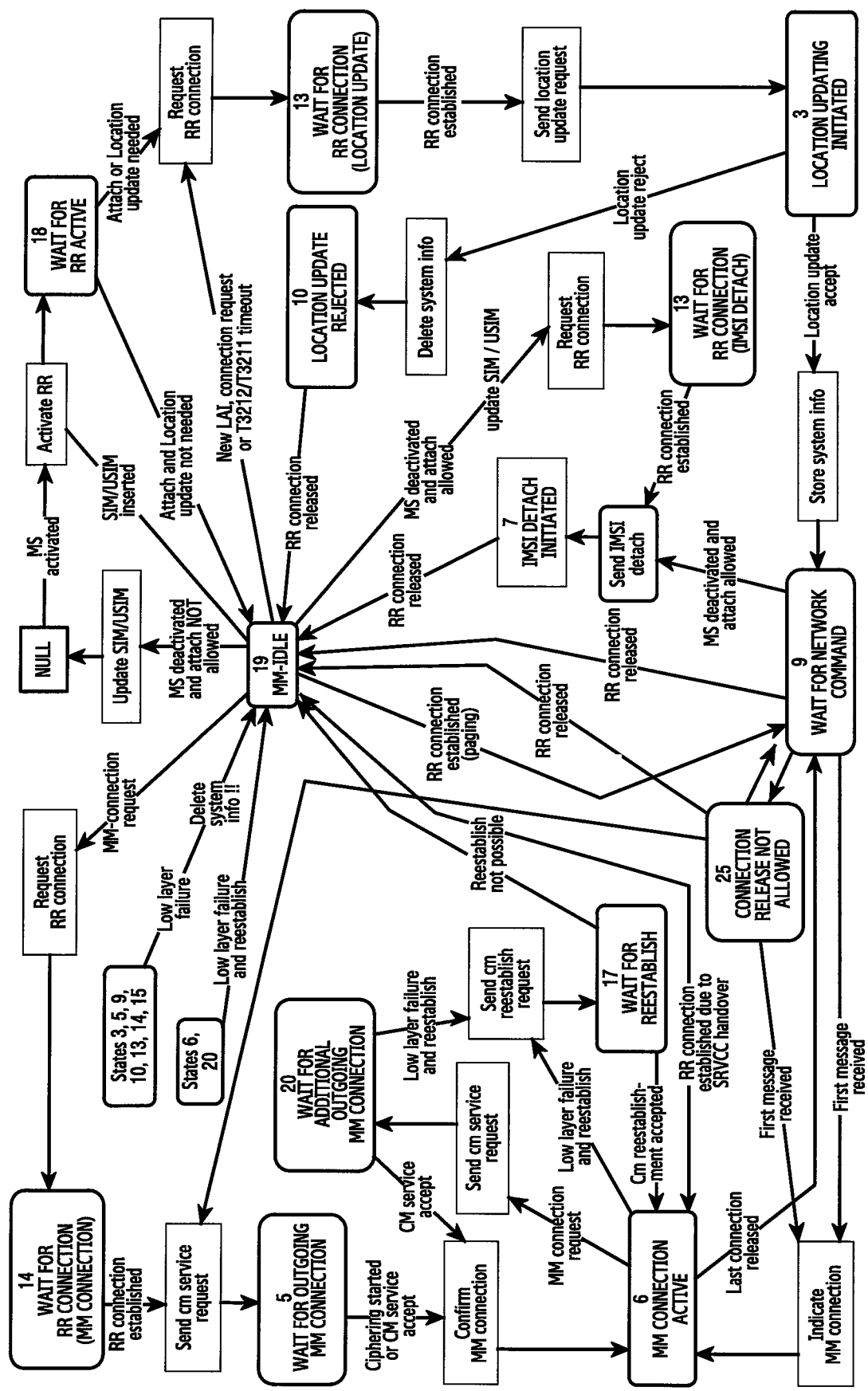
FIG. 4 illustrates a flow diagram of mobility management procedures in a $3^{rd}$ Generation Partnership Project (3GPP) communication network in accordance with an embodiment of the present disclosure.

FIG. 4 illustrates a diagram illustrating the mobility management protocol as set out in the 3GPP technical specification TS24.008. Although describing the full mobility management protocol in detail is beyond the scope of the present disclosure, the complexity of the protocol and the number of independent task that are required to be performed is evident from FIG. 4. Furthermore, some of the procedures illustrated may not be required after initial registration of a device if the resulting information may not change. For example, if a device does not change location, it may not be necessary to perform regular location updates.

Consequently, in order to reduce resources consumed by mobility management of low mobility devices, in 3GPP TS 22.368, a Machine Type Communication (MTC) low mobility feature as well as a high mobility feature were defined, where low mobility is defined as less than 30 km per hour maximum speed and high mobility is defined as larger than 30 km per our maximum speed in TR 45.820 v1.4.0. The MTC Feature Low Mobility is intended for use with MTC Devices that do not move, move infrequently, or move only within a certain region. The MTC Feature Low Mobility includes the ability for a network operator to change the frequency of mobility management procedures or simplify mobility management per MTC Device, and to define the frequency of location updates performed by the MTC Device in order to reduce signaling overheads and reduce power consumption at a user device.

However, in an analogous manner to eDRX and the checking of a paging or control channel, the MTC Feature Low Mobility allows changing the frequency of mobility management procedures and location updates, but it does not allow for the removal of mobility management completely for Low Mobility MTC devices. Consequently, even with the use of this approach, potentially unnecessary mobility management procedures may consume radio resources and reduce battery life of CIoT devices even though they may not move or move only within a smart home and thus, their mobility information does not require updating.

Limited Mobility Internet of Things Devices

As set out above, in current mobile networks such as those based upon the 3GPP standards, mobility management is based on the assumption that devices connected to the network are mobile to some extent and thus can be classed as those with low mobility and high mobility (high and low speed). However, such classification does not take into account devices which are predominantly stationary and are unlikely to move between cells i.e. the geographical coverage area of the base station via which they are currently connected to the mobile network. Accordingly, the mobility management features of 3GPP networks are also not adapted for efficient use with predominantly or substantially stationary devices such as CIoT devices in a smart home, which do not or are not expected to move out from the coverage area of the base station to which they are currently connected. Consequently, in accordance with an embodiment of the present disclosure, a new limited mobility class of device is defined such that when first registering with a network, a CIoT device (or potentially any other device) may indicate to the network that it has limited mobility as an alternative to low or high mobility and thus indicate to the network that its location with respect to the current cell (base station geographical coverage area) may not change or may only change relatively infrequently. In other words, the CIoT indicates to the network that it is stationary or moves within the same cell such that it is substantially stationary relative to the coverage area of its current base station, or that it does not change cells between communication instances with the network. Also, limited mobility class in the present disclosure may be defined such that an area on which the device is located is included in the current cell. By virtue of defining such a mobility indicator, the device and network may adapt various procedures, such as the mobility management, in order to take account of the stationary nature of the device, reduce potentially unnecessary overheads, and thus reduce power consumption at the device.

When a device first turns on and registers with a mobile network, it may indicate various parameters to the network via the transmission of a registration information that may include a classmark, which, among other things, may include an indication of the expected mobility of the device, for example, less than or greater than 30 km per hour in current 3GPP technical specifications, so that mobility management procedures can be adapted accordingly. However, in accordance with the present disclosure, an additional mobility class is provided for in the classmark that enables a device to indicate that it has limited mobility and thus is substantially stationary on a cell-wise basis with respect to time. For example, the classmark single may include the following bits as shown in Table 2 below to indicate the mobility class of the device.

TABLE 2

| Bits | Mobility Class |
| --- | --- |
| 00 | Limited Mobility |
| 01 | Low Mobility (≤30 km per hour) |
| 10 | High Mobility (>30 km per hour) |
| 11 | Reserved for future Use |

In contrast to the existing low and high mobility indicators, the limited mobility indicator provides an indication of mobility with respect to cells, cell boundaries and base station coverage areas rather than the speed of the device, thus the mobile network is provided with alternative information specifying whether the device is likely to move cells. This therefore allows for the scenario where a terminal device such as CIoT device may move around a home for example at any speed but does not change cells and also for a device which is substantially stationary with respect to movement speed.

As is explained in more detail below, with this additional mobility information the network may simplify mobility management procedures and paging procedures since it can be assumed that the device is unlikely to change cells.

In addition to defining a new mobility class, in accordance with embodiments of the present disclosure, a new operational mode (in addition to RRC_Idle and RRC_Connected) is also defined for devices with limited mobility, where this mode may be referred to as Network Disconnected Mode (NWDM). As is explained below in more detail, NWDM may be viewed as a mode between RRC_Idle and a device not currently registered with a network. It is anticipated that such a mode will be primarily of use to devices which are required to communicate with a network relatively infrequently, such as CIoT devices for example, though in practice any device may make use of such a mode.

The NWDM and hence a terminal device may either be in On (NWDM-On state) or Off (NWDM-Off state), where during the NWDM-On state a device may shut down the relevant receiver and not communicate with the network. Conversely, when in the NWDM-Off state the device may communicate with the network to transmit and receive data. Transitions between the NWDM-On and NWDM-Off states may be coordinated with the network such that the network does not attempt to communicate with a device when it is in the NWDM-On state. Subsequently, when a device transitions to the NWDM-Off state, the relevant receiver is powered-on and communications initiated with the network. As is explained in more detail below, when a device of limited mobility transitions between from the NWDM-On state to the NWDM-Off state, it is required to perform fewer signaling procedures with the network compared to a device which transitions from DRX to RRC_Connected in order to transmit and receive data, since, for example, location updates may not be required, and thus power consumption at the device may be reduced compared to DRX. Furthermore, as is also explained in more detail below, when a device is in the NWDM-Off state, although it is effectively disconnected from the network, the core network maintains the connection context of the device (PDN connection, IP address etc.) and the device's registration and thus when reconnecting to the network, the device is not required to perform a number of procedures which a conventional device being powered-on would be required to perform.

When a device transitions from the NWDM-On state and NWDM-Off state, the communications between the device and the network may take a number of alternative forms. In a first example, the device may have been pre-allocated uplink resources in a particular frame where this allocation was performed and indicated to the device prior to the device entering NWDM-On state, and the network has knowledge when the device is scheduled to transition between the NWDM-On and the NWDM-Off states. Consequently, when the device enters the NWDM-Off state, it transmits data to the network in the pre-allocated resources and the network receives the data.

In a second example, the device may have been pre-allocated downlink resources in a particular frame where this allocation was performed and indicated to the device prior to the device entering the NWDM-On state and the network has knowledge when the device is scheduled to transition between the NWDM-On and NWDM-Off states. Consequently, when the device enters the NWDM-Off state, it receives data from the network in the pre-allocated resources.

In a third example, the instead of transmitting or receiving data directly to/from the network upon transitioning to the NWDM-Off state, the device first receives an indication of downlink or uplink resources that it has been allocated and then proceeds to transmit or receive data, where the device may be required to receive signaling from a broadcast channel or other forms of control channel upon transitioning to the NWDM-Off state in order to obtain an indication of the allocated resources. Although such an approach may be more resource intensive due to possible increase in signaling, this approach enables the resources allocations to be determined close to the use of the resources, thus allowing for more flexible resource allocation.

In a fourth example, if a device has a relatively small volume of data to transmit in the uplink, as may be case for a utility smart meter for example, the uplink data may be transmitted in a random access channel such as the Physical Random Access Channel (PRACH) of a 3GPP wireless access interface, thus overcoming the need to allocate dedicated resources to the device and reducing overheads further since resource allocation signaling may not be required either preceding and subsequent to transitioning from the NWDM-On to NWDM-Off states.

The use of the NWDM may entail a device entering a sleep-type state or reduced-power state (NWDM-On state), during which the receiver may be turned-off for example, and periodically waking to communicate with the network (NWDM-Off state). For example, a utility smart meter may be required to report to a network every day or week. Furthermore, due to the nature of many IoT devices, their data usage patterns may be relatively predictable and/or periodic and the volume of data transmitted at each communication event relatively constant, for example, a utility smart meter may only transmit data representing a 5 digit meter reading and associated error coding.

Consequently, for the NWDM to be effectively configured by the network and for resources to be allocated efficiently or pre-allocated, it would be advantageous if information on or an indication of data transmission frequency and resource usage of a device is provided to the network prior to entering the NWDM.

Therefore, in accordance with embodiments of the present disclosure, in addition to providing a mobility indication as part of registration information to the network when first registering with the network, if a device indicates that it is limited mobility, the device may also provide a data transmission frequency indicator and/or a resource usage indicator which indicates to the network the expected data transmission frequency and/or resource usage (data volume transmission) of a device.

A data transmission frequency indicator may indicate a particular frequency transmission class or period, where the classes may represent temporal transmission frequencies of every minute, hourly, daily or weekly for example. Such an indicator may be transmitted along with the limited mobility indicator in the classmark (registration information) or may be transmitted subsequent to the classmark or other registration information. In some examples, the data transmission frequency may be transmitted when requested by the network.

Table 3 below provides a number of example codes that may be transmitted as part of the classmark to indicate the data transmission frequency class which a CIoT device belongs to, where codes made up of fewer or a greater number of bits may also be used and the time periods may also vary.

TABLE 3

| Bits | Data Transmission Frequency Class |
| --- | --- |
| 000 | 10 Mins |
| 001 | 30 Mins |

TABLE 3-continued

| Bits | Data Transmission Frequency Class |
|---|---|
| 010 | 1 Hour |
| 011 | 6 Hours |
| 100 | 12 Hours |
| 101 | One Day |
| 110 | One Week |
| 111 | Reserved for Future Use |

Once an indicator of the data transmission frequency has been provided to the network, if resources are to be pre-allocated to device for when it transitions to the NWDM-Off state, the network may allocate such resources and indicate a timer value to the device that will expire close to when the pre-allocated resources occur. Consequently, the device and the network may have substantially synchronized timers set to the appropriate period, whereby when the device enters the NWDM-On state the device's timer is started and the device transitions to the NWDM-Off state when the device's timer expires. Likewise, the core network may also include a corresponding timer synchronized with the device's timer such that it is provided with an indication of when a device is to transition from the NWDM-On state to the NWDM-Off state.

Although Table 3 and the foregoing description predominantly refers to frequency transmission indicators in terms of time, and it is specified that timers may be used at the device and network to coordinate the transitions between NWDM states, the present disclosure is not limited to such implementations. For instance, instead of a temporal indicator, alternative decision parameter(s) may be set as the trigger for transitioning between NWDM states. For example, a change in an environmental parameter such as weather conditions and alarm messages may trigger a NWDM state transition. Alternatively, a change in frequency parameters of a network may be used at the device and network to initiate the transition between NWDM states. Although preferably both the device and the network will have knowledge of the decision parameter and the condition related to the decision parameter such that the device and network can be approximately synchronized, this may not always be the case. For example, with regards to a decision parameter based on environmental conditions of which the network does not have knowledge, the device may transition between the NWDM states based on a change of environmental conditions and the decision parameter and then subsequently inform the network of such a transition. In such an example, the network may maintain the connection context of the device but not allocated resources or provide any signaling for the device until the device has indicated to the network that it has transitioned to the NWDM-Off state.

A resource usage indicator i.e. a data volume indicator may indicate a particular resource usage class where each class corresponds to an expected volume of user plane data that a device expects to transmit and or receive when it enters the NWDM-Off state. By virtue of the provision of such an indicator, the network may accurately and efficiently pre-allocate resources to the device, such that the device may be provided with an indication of the resources prior to entering the NWDM-On state and powering-down the relevant receiver and/or transmitter.

As for the data transmission frequency indicator, a number of different classes may be defined based on the volume of data which is to be transmitted, for example, as shown in Table 4 below, four different classes may be defined.

Although only four classes are shown in Table 4, any number of classes may be defined each with a different associated data volume.

TABLE 4

| Bits | Data Volume (Bytes) |
|---|---|
| 00 | Up to 20 |
| 01 | Up to 50 |
| 10 | Up to 200 |
| 11 | Not Applicable/Variable |

In addition to providing relatively exact data transmission volumes indicators, as shown by the code 11 in Table 4, an indicator may also be provided which indicates that the data requirements of the device may vary, therefore resources requirements may be required to be negotiated prior to each transmission rather than in advance prior to the device entering the NWDM-On state. As for the data transmission frequency indicator, the data volume indicator may be transmitted along with the limited mobility indicator in the classmark, transmitted subsequent to the classmark and transmitted in response to a request from the network.

By virtue of providing the network with a data transmission frequency indicator and a data volume indicator, the network can set up the NWDM with the device by setting an appropriate timer (or other decision parameter) and allocating an appropriate volume of resources, and indicate these parameters to the device. In response, the device may initiate a substantially synchronized timer and record the resource allocation, and enter and remain in the NWDM-On state until the expiry of the timer. Upon expire of the timer, the device may then transition to the NWDM-Off mode and utilize the allocated resources. The allocated resources may be a one-time allocation such that a different allocation is provided to a device prior to each entry into the NWDM-On state, or may be a persistent allocation where a device is provided with a same allocation of resources for each time it enters the NWDM-Off state. Although the use of a persistent resource allocation may reduce flexibility in resource allocation, it may results in reduced signaling overheads since an allocation may only be required to be signaled to the device once.

Device Registration and Network Disconnected Mode Setup

Figure 5:
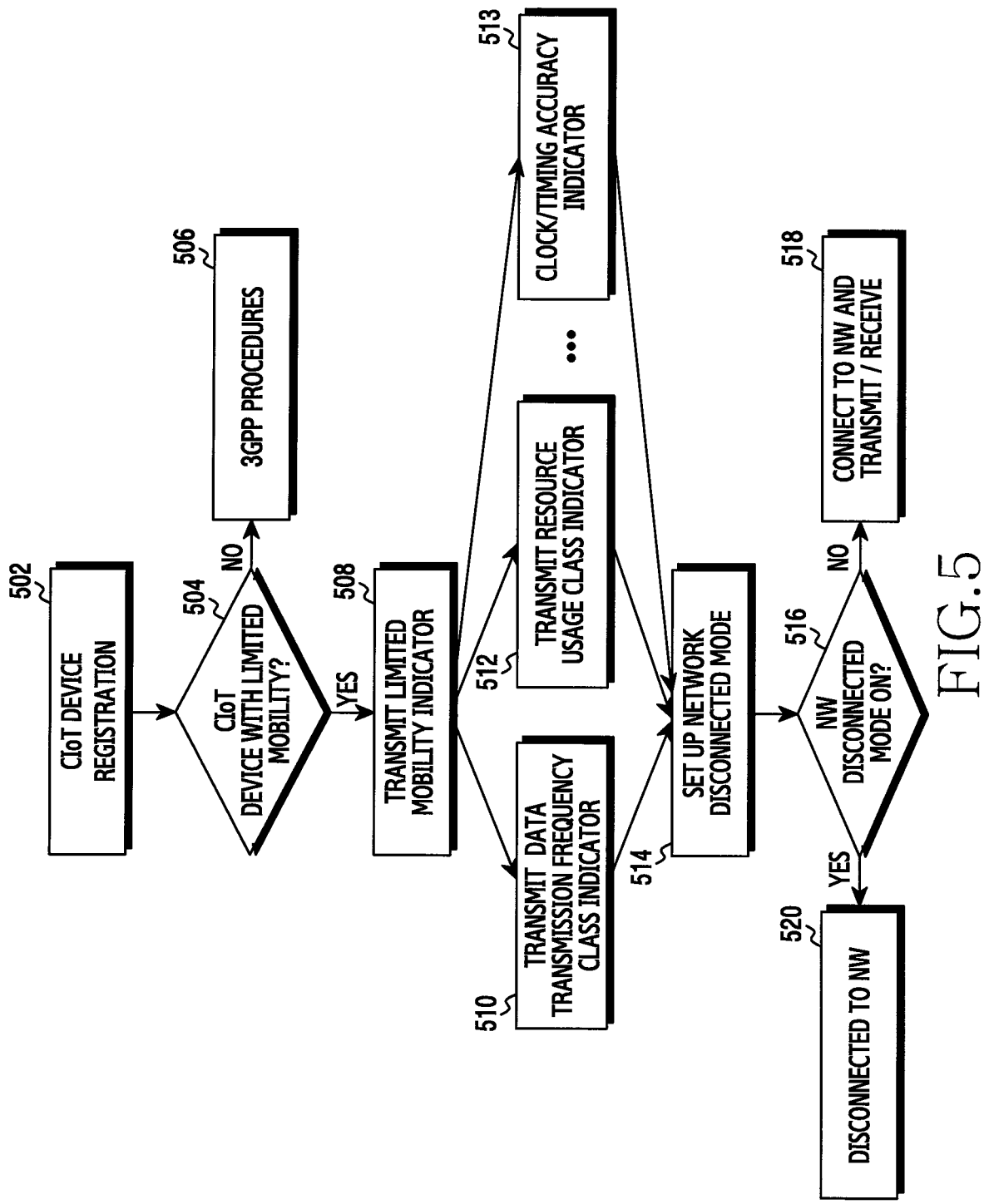
FIG. 5 illustrates a flow diagram of a Network Disconnected Mode (NWDM) setup procedure in accordance with an embodiment of the present disclosure.

FIG. 5 illustrates a flow diagram illustrating an example procedure for setting up the NWDM at a CIoT device in accordance with an example of the present disclosure.

At operation 502, the CIoT device registers with the network according to any suitable approach as set out in the 3GPP standards. For example, the base station may transmit one or more signals identifying the base station and/or providing information required for the device to register with the network. The process of registration is envisaged to occur when a device is first turned-on, however, it may also occur for example if synchronization in terms of NWDM transitions between the network and the device is lost or the device moves between coverages areas and thus attaches to an alternative base station.

At operation 504, the device determines whether it is a CIoT device with limited mobility, i.e. whether it stationary or stationary relative to the current base station coverage area and therefore does not expect to change cells/base stations. A CIoT device may be pre-configured with such information, or alternatively it may be user configurable or a device may determine its mobility itself be monitoring the available cells whose coverage area it is within.

At operation 506, if the device is not of limited mobility the device may perform conventional 3GPP procedures for mobility management, resource allocation and the like by virtue of not including a limited mobility indication in registration information.

At operation 508, if it is determined that the device is of limited mobility, the device transmits such an indication to the network. For example the device may include the indication in a classmark signal which is transmitted to the network. By providing such an indication to the network, the network may adapt it registration procedure to take account of the limited mobility of the registering device.

At operation 510 the device transmits a transmission data frequency class indicator or other decision parameter to the network.

At operation 512, the device transmits a resource usage class indicator to the network and may also optionally transmit at operation 513 a clock/timing accuracy class or indication to the network which, as is explained below, may be used by the network to determine a NWDM timer value.

Although operations 508, 510, 512 and 513 have been illustrated as being separate, they may also be included in a single transmission or provided upon request by the network. For example, the various indicators may all be included in the classmark signal which is transmitted once it has been determined that the device has limited mobility. Furthermore, as shown in Tables 2 to 4, the various indicators may be formed from relatively few bits and therefore these bits may be included in a current classmark by using currently unused bits in the classmark signal as defined in 3GPP technical specifications.

At operation 514, the device receives NWDM parameters from the network which has determined them based upon the data transmission class indicator and resource usage class indicator. The device then configures the NWDM mode by initiating and starting a timer, and where appropriate recording any pre-allocated resources. It is also at this point that the connection parameters of the device may be configured by the network and device. For example, one or more of authentication, identification, context establishment, PDN connection(s) establishment, IP address allocation may also be performed at operation 514. In order to generate the NWDM setup parameters, the network may perform a number of determination operations at operation 514, for example, the network may determine the resource allocation based on the data resource and data transmission frequency indicators and determine a timer value based on the data transmission frequency period and/or the determined resource allocation. The network may also provide other information to the device, for example a synchronization indicator in order for the timer to be synchronized.

At operation 516, once the NWDM has been set up, the device determines whether it is either in the NWWDM-On or NWDM-Off state i.e. by checking for the expiry of a timer for example. If the device is in the NWDM-On state the device disconnects from the network at operation 516 and does not transmit or receive data from the network.

In an alternative implementation, the terminal may enter the NWDM-On state once it has transmitted its data at operation 516, and then start the timer such that the initiation of the timer is in response to entering the NWDM-On state. Once the timer expires, the device may be disconnected to the network at operation 520. Alternatively, if the network disconnected mode timer is not running, the device connects to the network at operation 518 and commences the transmission and/or reception of data according to the connection parameters set up during operation 514.

The setting up of the NWDM may include a number of further or alternative steps/operations which are not illustrated in FIG. 5. For example, upon the provision of the data transmission frequency indicator and resource usage indicator to the network, the network may determine an absolute time at which the device should exit the NWDM-On state and communicate this to the device rather than providing a timer value. The network may also not determine the NWDM state transition time based only on the device of interest. For example, since the IoT is anticipated to be formed from a large number of devices, a single cell may contain 100s or 1000s of CIoT devices. Consequently, in order to reduce potential network congestion and perform load balancing, the network may coordinate allocation of resources to the limited mobility CIoT devices such that large number of devices do not transmit and receive data at the same time. For example, if a particular cell includes 10 smart meters which are required to report their readings once a day, the network may stagger the initiation of the NWDM timers which have a period of approximately one day by one minute such that the 10 smart meters do not report their readings at the same time and congest the network. Furthermore, the resources allocated to CIoT device that may not communicate time-critical data, may be allocated at off-peak times when there is likely to be relatively little traffic on the network, for example, during the night.

As shown in Table 3, the duration that a device may stay in the NWDM-On state may vary significantly. For example, a thermostat may report a temperature reading every hour and thus its NWDM timer may be set to a duration of an hour. In contrast, a smart utility meter may report a reading only every week. As set out above, during the NWDM-On state it is anticipated that a device does not transmit or receive signals to or from the network. Therefore, synchronization between the clock at the device and the network may be lost due to clock drift. An implication of this may be that when a device is in the NWDM-On state for a relatively long period of time, the NWDM timers at the network and device may expire at different times i.e. lose synchronization. Consequently, in order reduce the likelihood of a device missing its pre-allocated resources due to a loss of synchronization, a margin of error may be provided when setting the NWDM timers or when the network provides a device with an absolute time. For example, even though resources are allocated to the device by the network once each week, the value of the associated timer may be set to less than seven days and the device configured to monitor a plurality of radio frames when it enters the NWDM-Off state such that the device has a reception/transmission window. In this manner, as long as the pre-allocated resources fall within the window, the device has access to the resources. This approach therefore introduces a margin of error into the NWDM state transitions timing such lapses in synchronization between the network and the device due to clock drift can be accommodated and the chance of pre-allocated resources being missed reduced.

Although through the description of embodiments of the present disclosure the term Network Disconnected Mode is used, there are a number of differences between a CIoT device being in the NWDM-On state and a conventional non-limited mobility device being disconnected i.e. turned off.

Firstly, when a CIoT device enters NWDM-On state, it retains its context i.e. its IP address, PDN connection, allocated S-GW etc., whereas by turning off a conventional 3GPP device these are lost since the device is no longer considered to be registered with the network. Secondly, when a CIoT device transitions form the NWDM-On state to the NWDM-Off state, the device is not required to perform identification, authentication, RRC connection request procedures etc. Instead, these procedures are performed once when the CIoT device first registers with the network and the NWDM mode is initially set up. Consequently, as is described in more detail with respect to FIG. 7, a CIoT device that transitions from a NWDM-On state to the NWDM-Off state may perform relatively few signaling operations in order to transmit or receive data compared to a device which is fully disconnected from the network and thus may make power in comparison to both a device performing DRX and a device which is turned-off in between communication instances.

Mobility Management Signaling

Figure 6:
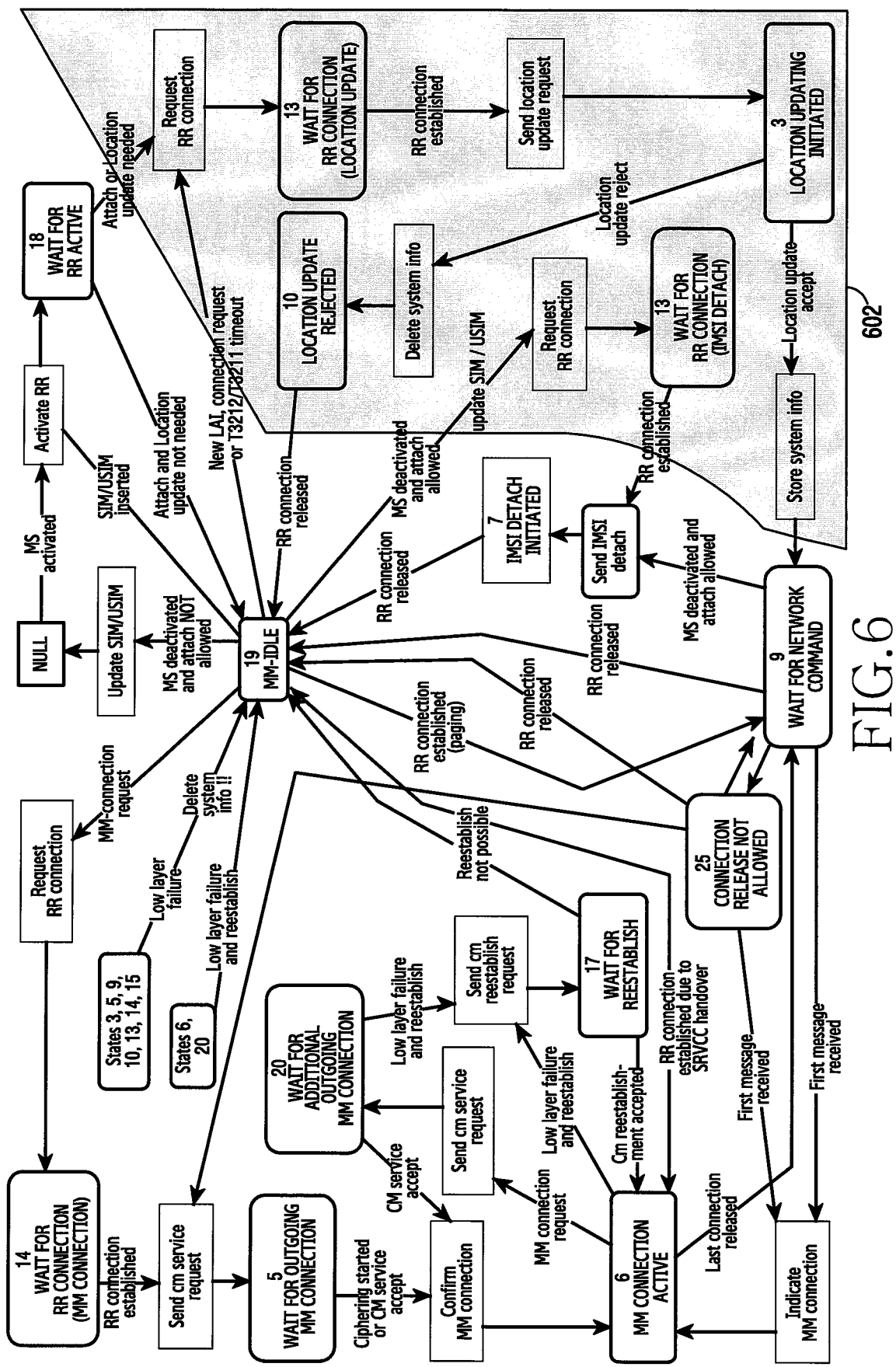
FIG. 6 illustrates a schematic illustration of mobility management procedures in accordance with an embodiment of the present disclosure.

3GPP compliant devices and networks are conventionally required to perform a range of mobility management protocols such that the location of a device is known to a network, paging messages can be provided to the appropriate base stations, and handover may take place for example. FIG. 6 illustrates a diagram providing an overview of the mobility management signaling that takes in a 3GPP network such as that described with reference to FIG. 1 and as set out in 3GPP technical specification TS24.008.

Although it is beyond the scope of the present application to describe in detail each of the individual procedures set out in FIG. 6, of interest to embodiments of the present disclosure is the location tracking procedure represented by the right hand shaded portion 602 of the FIG. 6.

In conventional 3GPP devices the location tracking procedure is performed at regular intervals in order to ensure that the network has knowledge of the current location of the attached devices. However, regular location tracking and updating may not be necessary if a device can be assumed to be stationary. Consequently, in accordance with the present disclosure, if a CIoT device provides an indication of limited mobility to the network, the network can assume that the device will be stationary on a cellular level and therefore suspend some mobility management procedures. Accordingly, regular location tracking and updating signaling indicated in FIG. 6 by the shaded portion may be reduced or preferably avoided/suspended thus reducing the communication burden on both the network and the CIoT device and further reducing power consumption in comparison to devices which perform only DRX. However, in order that the network has knowledge of the location of the CIoT device, location information may still be required to be obtained/ascertained when the CIoT device first registers with the network, when the NWDM is first being set up, or when a device changes moves between base station coverage areas.

Network Disconnected Mode on State

Figure 7:
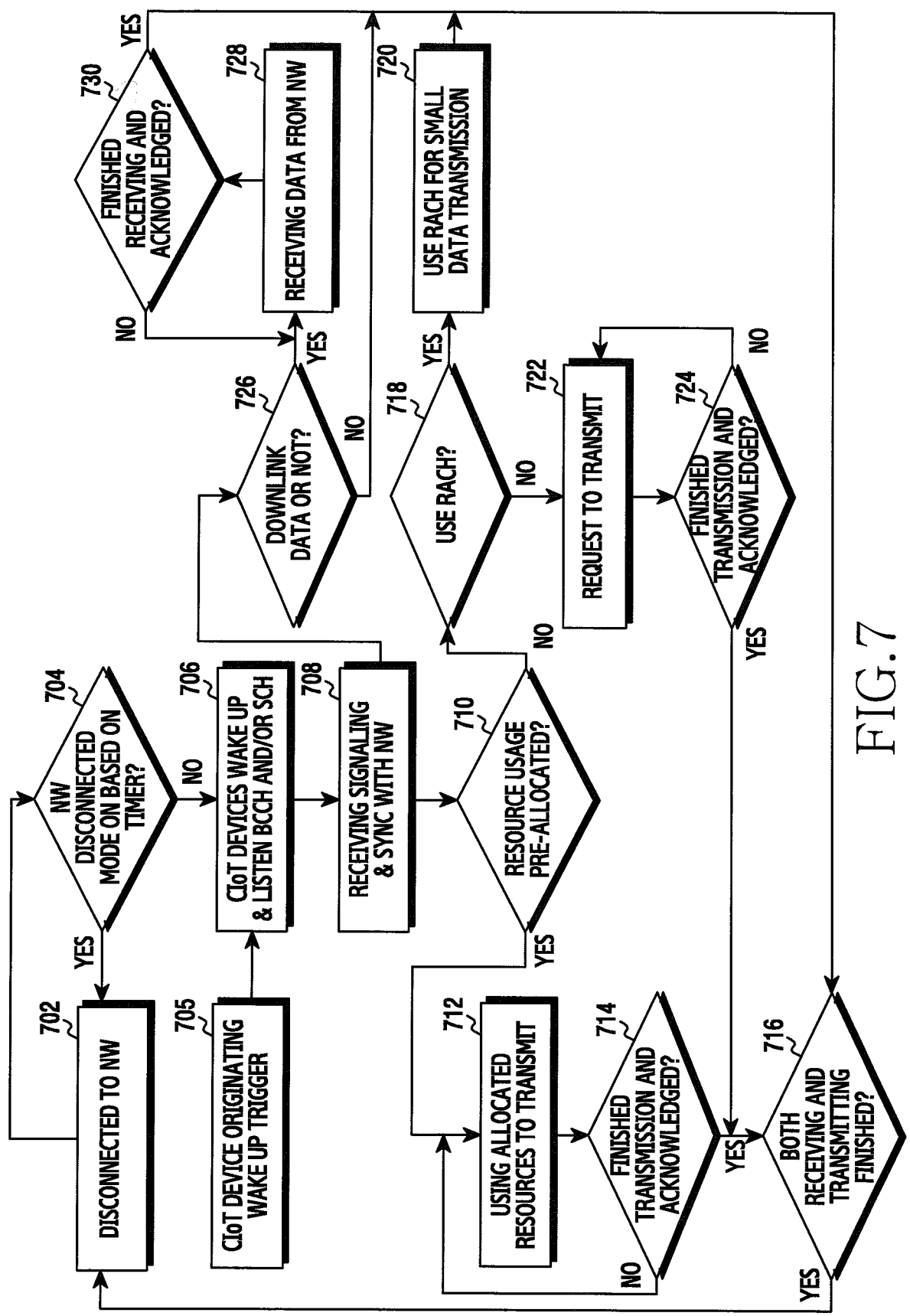
FIG. 7 illustrates a flow diagram of a Network Disconnected Mode (NWDM) state transition procedure in accordance with an embodiment of the present disclosure.

As set out above, according to an embodiment of the present disclosure, a CIoT device with limited mobility may transmits and receive data to and from a network with reduced overheads compared to conventional 3GPP terminal devices. A number of these signaling overheads are reduced or preferably avoided by virtue of the relatively simple procedure which a CIoT device with limited mobility performs when it transitions from the NWDM-On state to the NWDM-Off states i.e. reconnects to the network. To illustrate the procedure performed by a CIoT device when transitioning from NWDM-On state to the NWDM-Off states, FIG. 7 illustrates a flow diagram showing an example of such a procedure.

At operation 702 the CIoT device is in the NWDM-On state and is disconnected from the network. Consequently, the CIoT device is not receiving or transmitting any data but is still registered at the network such that authentication, context establishment etc. are not required to be performed when transitioning to the NWDM-Off state. The state of the device at operation 702 may therefore be considered to correspond to operation 520 of FIG. 5.

At operation 704 the CIoT device determines whether the NWDM-On timer has expired. If the timer has not expired, the CIoT device remains in NWDM-On state. However, if the timer has expired the CIoT device transitions to the NWDM-Off state and proceeds to operation 706. Alternatively, at operation 705 the CIoT may transition to the NWDM-Off state in response to a CIoT originating trigger which may be based on factors other than a timer, such as an external environment condition for example.

At operation 706, the CIoT device turns on its receiver and listens to one or more channels physical and logical channels in order to obtain synchronization information and any downlink signaling which the network is transmitting to the CIoT device. For example, the CIoT device may listen to a broadcast channel (BCCH) and/or a synchronization channel (SCH).

At operation 708 the CIoT device uses the received synchronization and broadcast information to synchronize its clock with the network and to establish whether there is downlink data to be received from the network. Alternatively, the information may be used to identify the location of uplink control channel which the device may utilize to request uplink resources. The time taken for synchronization to take place may vary depending on the extent to which synchronization has been lost. For example, if the CIoT device has a highly accurate clock and/or the CIoT device was in the NWDM-On state for a relatively short period of time, any loss in synchronization is likely to be small and therefore the CIoT device will likely be able to quickly locate and receive necessary synchronization information and signaling data. In contrast, if the CIoT device has a lower accuracy clock and/or the CIoT device was in the NWDM-On state for a relatively long period of time, the loss in synchronization is likely to relatively large and therefore the CIoT device may take an increased amount of time to locate and receive the necessary synchronization information and resource signaling.

Accordingly, in some embodiments, an increased margin for error with respect to NWDM state transition timing may be provided for CIoT devices which have lower accuracy clocks and or have a low data transmission frequency. Consequently, devices with reduced accuracy synchronization may have an increased period of time to perform synchronization and receive the signaling indicating their allocated resources. In practice and as described above, this margin for error may be provided by setting the timer to values (i.e. the network provided an indication of timer values) such that the timer expires in good time prior to the occurrence of any resources that have been allocated to the relevant CIoT device.

At operation 710, once synchronization has been performed, the CIoT device determines from information supplied by the network when setting up the NWDM or from information obtained in operation 708, whether uplink resources have been pre-allocated.

At operation 718, if it has been determined that uplink resources have not been pre-allocated to the CIoT device, the CIoT device proceeds to determine whether to use a random access channel (RACH) to transmit data to the network. This determination may be based on a parameter set during setting up of the NWDM or in some examples may be dependent on the volume of data which is to be transmitted. For example, if a relatively small volume of data to be transmitted the random access channel (RACH) may be used and thus the procedure progresses to operation 720. Alternatively, if a large volume of data is to be transmitted, the CIoT device does not use a RACH, but may request dedicated resources from the network at operation 722. The CIoT device may receive the dedicated resources from the network. Then, the CIoT device may transmit the uplink data using the received dedicated resources.

At operation 724, once it has been determined that all uplink data has been transmitted in the resources requested in operation 722 and, if required, acknowledged, the CIoT device proceeds to operation 716.

If it is determined that resources have been pre-allocated at operation 710, at operation 712 the CIoT device proceeds with transmitting the data to the network in the allocated resources.

At operation 714, once it has been determined that all uplink data has been transmitted in the allocated resources in operation 712 and, if required, acknowledged, the CIoT device proceeds to operation 716.

At operation 716, if it is determined that the transmission and reception of all data has been completed, the CIoT device may then reset the NWDM timer and enter the NWDM-On state, where the timer setting and allocated resources are equivalent to those determined when the NWDM was initially set up upon. Alternatively, an additional negotiation operation may take place in which the CIoT device and the network re-synchronize the timer and the CIoT device is informed of the new timer value or decision parameter and a new set of pre-allocated resources where are to be used the next time the CIoT device transitions to the NWDM-Off state.

In addition to the transmission of data to the network, if it is determined at operation 726 that there is downlink data to be received based on the signaling received in operation 708, the CIoT device proceeds with receiving the downlink data from the network at operation 728. Once the downlink data has been received and, if required, acknowledged, the procedure progresses to operation 716 and the CIoT device awaits the completion of the transmission of the uplink data. If at operation 726 it is determined that there is no downlink data to be received the procedure progresses to operation 716 and the CIoT device awaits the completion of the transmission of the uplink data.

As previously discussed and as illustrated by FIG. 7, the procedure for transitioning from the NWDM-On state to the NWDM-Off state is less complex than when a device first registers with a network and thus power savings are made with respect to a device which fully disconnects from a network after each data transmission. Furthermore, with respect to DRX, location updating, RRC connections requests and the checking of a paging channel is not required and thus power savings are also made with respect to DRX and eDRX.

Through the description of embodiments of the present disclosure, the functionality associated with the limited mobility indication and the setting up and implementation of the NWDM has been described as being performed at the CIoT device or the network. Accordingly, the CIoT device or terminal device may comprise one or more of a receiver, transmitter, controller, and memory configured to perform the functionality described above, Likewise, the network is formed from number of separate elements each with their own specific functionality as described with reference to FIG. 1. Accordingly, the functionality said to be performed by the base station or network may be performed by one or more appropriately configured elements of the network. For example, the core network may coordinate and perform the setting of the context of limited mobility CIoT devices and setting up of the NWDM, whereas the base stations may perform the generation and synchronization of the synchronization signals.

Figure 8:
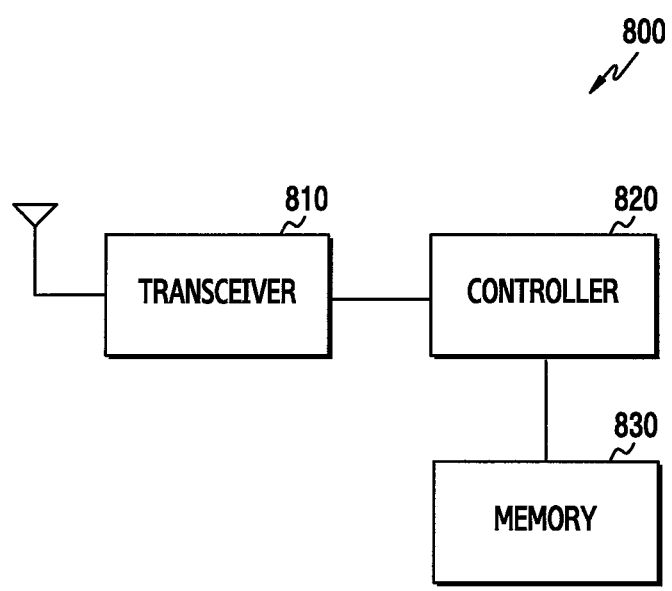
FIG. 8 illustrates a functional block diagram of a terminal device in accordance with an embodiment of the present disclosure.

FIG. 8 illustrates functional block of a terminal device in accordance with an embodiment of the present disclosure.

The device comprises a transceiver 810, a controller 820, a memory 830, and at least one antenna. In various implements, the components included in the device 800 may be deleted or additional components may be added in the device 800. Also, in various embodiments of the present disclosure, the components illustrated in FIG. 8 may be combined each other, or one of the components may be included in another of the components.

The controller 820 may comprise single processor core, or multiple processor cores. In some embodiments, the controller 820 may be multi core such as dual-core, quad core, or hexa core. The controller 820 may be configured to perform various operations for the CIoT device. In some embodiments, the controller 820 is configured to transmit, to a base station connected to a network, registration information for registering with the network, wherein the registration information includes information for indicating that the predetermined area is included in a coverage area of the base station, and communicate with the base station based on the registration information.

Also, in some embodiments, the controller 820 is further configured to receive, from the base station, parameter information for determining a connection mode between the terminal and the network, determine the connection mode based on the parameter information, wherein the connection mode comprises a first mode in which the terminal communicates with the network and a second mode in which the connection between the terminal and the network is disconnected.

Also, in some embodiments, the registration information further comprises at least one a first information indicating frequency of uplink data transmission, a second information indicating available resource in the terminal, and a third information regarding clock included in the terminal, wherein the parameter information is generated, by the network, based on the registration information, and wherein the parameter information comprises information regarding transmission period of the uplink data and information regarding resource allocation for the uplink data.

Even though FIG. 8 illustrates the components as being configured to operation for the CIoT device, according to the various embodiments, the components may be configured to implement for the base station connected to the network.

In some embodiments, the controller 820 is configured to receive, from a terminal which is located within a predetermined area, registration information used for the terminal registering with the network, wherein the registration information includes information for indicating that the predetermined area is included in a coverage area of the base station; and communicating with the terminal based on the registration information.

Also, in some embodiment, the controller 820 is further configured to receive, from the network, parameter information for determining a connection mode between the terminal and the network transmit, to the terminal, the parameter information, wherein the connection mode comprises a first mode in which the terminal communicates with the network and a second mode in which the connection between the terminal and the network is disconnected.

Also, in some embodiments, the controller 820 is further configured to wherein if the first mode is determined by the terminal, receive, from the terminal, uplink data based on the parameter information.

Also, in some embodiments, the controller is further configured to wherein if the first mode is determined by the terminal, receive, from the terminal, uplink data using a random access channel (RACH).

Also, in some embodiments, the controller is further configured to wherein if the first mode is determined receive, from the base station, a resource allocation request message, transmit, to the terminal, resource allocation information, and receive, from the base station, uplink data based on the resource allocation information.

The UE functionality described above may be implemented on a multiple purpose processor which executes computer readable instructions stored on a computer readable medium which when executed configure the multiple purpose processor and peripheral components to perform the functionality described with reference to the example embodiments.

The network functionality described above may be implemented on a multiple purpose processor which executes computer readable instructions stored on a computer readable medium which when executed configure the multiple purpose processor and peripheral components to perform the functionality described with reference to the example embodiments Throughout the description and claims of this specification, the words "comprise" and "contain" and variations of them mean "including but not limited to", and they are not intended to (and do not) exclude other components, integers or operations. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps/operations of any method or process so disclosed, may be combined in any combination, except combinations where at least some of such features, operations, and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the operations of any method or process so disclosed.

The reader's attention is directed to all papers and documents which are filed concurrently with or previous to this specification in connection with this application and which are open to public inspection with this specification, and the contents of all such papers and documents are incorporated herein by reference.

The various embodiments of the present disclosure may also be implemented via computer executable instructions stored on a computer readable storage medium, such that when executed cause a computer to operate in accordance with any other the aforementioned embodiments.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a terminal in a wireless environment, the method comprising:
   identifying a mobility class of the terminal from a limited mobility, a low mobility, and a high mobility;
   transmitting, to a base station connected to a core network, first information indicating the limited mobility that is used for a registration of the terminal, and second information for determining at least one parameter for a network disconnected mode (NWDM), if the mobility class is the limited mobility;
   receiving the at least one parameter for the NWDM that is determined based on the second information; and
   controlling a connection with the base station as connected or disconnected according to a state of the NWDM that is identified based on the at least one parameter,
   wherein the limited mobility is selected in case that the terminal is stationary in a cell of the base station regardless of a speed of the terminal,
   wherein the low mobility indicates that the speed of the terminal is lower than a threshold,
   wherein the high mobility indicates that the speed of the terminal is higher than the threshold,
   wherein the connection with the base station is connected during an off-state of the NWDM and is disconnected during an on-state of the NWDM,
   wherein the registration is maintained at the core network, while the terminal is disconnected with the base station according to the NWDM, and
   wherein the first information causes the base station to configure the NWDM for the terminal.

2. The method of claim 1, wherein the second information indicates at least one of a frequency of an uplink data transmission, a available resource in the terminal, or a clock/timing accuracy of the terminal, and
   wherein the at least one parameter comprises at least one of a transmission period of an uplink data, a timer value for changing the state of the NWDM, or resource allocation for the uplink data.

3. The method of claim 1, wherein the controlling of the connection with the base station comprising:
   transitioning from the on-state of the NWDM where the terminal is disconnected with the base station to the off-state of the NWDM where the terminal is connected with the base station, in response to an expiry of a timer that starts in response to entering the off-state of the NWDM.

4. The method of claim 1, wherein the controlling of the connection with the base station comprising:

transmitting, to the base station, uplink data during an off-state of the NWDM where the terminal is connected with the base station, using resources,
wherein the resources are identified by the at least one parameter, or are allocated by a request of the terminal after entering the off-state.

5. The method of claim 1, herein the controlling of the connection with the base station comprising:
transmitting, to the base station, uplink data during the off-state of the NWDM where the terminal is connected with the base station, using a random access channel (RACH).

6. The method of claim 1, wherein the controlling of the connection with the base station comprising:
deactivating a receiver of the terminal during the on-state of the NWDM; and
activating the receiver of the terminal during the off-state of the NWDM.

7. The method of claim 1, wherein the controlling of the connection with the base station comprising:
transitioning from the on-state of the NWDM where the terminal is disconnected with the base station to the off-state of the NWDM where the terminal is connected with the base station, without an authentication and a context establishment.

8. The method of claim 1, wherein the controlling of the connection with the base station comprising:
transitioning from the on-state of the NWDM where the terminal is disconnected with the base station to the off-state of the NWDM where the terminal is connected with the base station, without performing a location update.

9. A base station in a wireless environment, the base station comprising:
a transceiver; and
at least one processor operably coupled to the transceiver, wherein the at least one processor is configured to:
receive, from a terminal, first information indicating a limited mobility that is used for a registration of the terminal, and second information for determining at least one parameter for a network disconnected mode (NWDM), if the terminal identifies a mobility class of the terminal from the limited mobility, a low mobility, and a high mobility, and
transmit the at least one parameter for the NWDM that is determined based on the second information,
wherein the limited mobility is selected when the terminal is stationary in a cell of the base station regardless of a speed of the terminal,
wherein the low mobility indicates that that the speed of the terminal is lower than a threshold,
wherein the high mobility indicates that the speed of the terminal is higher than the threshold,
wherein a connection with the terminal is controlled as connected or disconnected according to a state of the NWDM that is identified based on the at least one parameter,
wherein the connection with the base station is connected during an off-state of the NWDM and is disconnected during an on-state of the NWDM,
wherein the registration is maintained at a core network, while the terminal is disconnected with the base station according to the NWDM, and
wherein the first information causes the base station to configure the NWDM for the terminal.

10. The base station of claim 9, wherein the second information indicates at least one of a frequency of an uplink data transmission, a available resource in the terminal, or a clock/timing accuracy of the terminal, and
wherein the at least one parameter comprises at least one of a transmission period of an uplink data, a timer value for changing the state of the NWDM, or resource allocation for the uplink data.

11. The base station of claim 9, wherein the at least one processor is further configured to:
receive, from the terminal, uplink data during an off-state of the NWDM where the terminal is connected with the base station, using resources,
wherein the resources are identified by the at least one parameter, or are allocated by a request of the terminal after entering the off-state.

12. The base station of claim 9, wherein the at least one processor is further configured to:
receive, from the terminal, uplink data during an off-state of the NWDM where the terminal is connected with the base station, using a random access channel (RACH).

13. A terminal in a wireless environment, the terminal comprising:
a transceiver; and
at least one processor operably coupled to the transceiver, wherein the at least one processor is configured to:
identify a mobility class of the terminal from a limited mobility, a low mobility, and a high mobility,
transmit, to a base station connected to a core network, first information indicating the limited mobility that is used for a registration of the terminal, and second information for determining at least one parameter for a network disconnected mode (NWDM), if the mobility class is the limited mobility,
receive the at least one parameter for the NWDM that is determined based on the second information, and
control a connection with the base station as connected or disconnected according to a state of the NWDM that is identified based on the at least one parameter,
wherein the limited mobility is selected in case that the terminal is stationary in a cell of the base station regardless of a speed of the terminal,
wherein the low mobility indicates that the speed of the terminal is lower than a threshold,
wherein the high mobility indicates that the speed of the terminal is higher than the threshold,
wherein the connection with the base station is connected during an off-state of the NWDM and is disconnected during an on-state of the NWDM,
wherein the registration is maintained at the core network, while the terminal is disconnected with the base station according to the NWDM, and
wherein the first information causes the base station to configure the NWDM for the terminal.

14. The terminal of claim 13, wherein the second information indicates at least one of a frequency of an uplink data transmission, a available resource in the terminal, or a clock/timing accuracy of the terminal, and
wherein the at least one parameter comprises at least one of a transmission period of an uplink data, a timer value for changing the state of the NWDM, or resource allocation for the uplink data.

15. The terminal of claim 13, wherein the at least one processor is further configured to:
transition from an on-state of the NWDM where the terminal is disconnected with the base station to an off-state of the NWDM where the terminal is connected with the base station, in response to an expiry of a timer that starts in response to entering the off-state of the NWDM.

16. The terminal of claim 13, wherein the at least one processor is further configured to:
   deactivate the transceiver during the on-state of the NWDM; and
   activate the transceiver during the off-state of the NWDM.

17. The terminal of claim 13, wherein the at least one processor is further configured to:
   transition from the on-state of the NWDM where the terminal is disconnected with the base station to the off-state of the NWDM where the terminal is connected with the base station, without an authentication and a context establishment.

18. The terminal of claim 13, wherein the at least one processor is further configured to:
   transition from the on-state of the NWDM where the terminal is disconnected with the base station to the off-state of the NWDM where the terminal is connected with the base station, without performing a location update.

* * * * *